A. T. HOPKINS.
PROCESS FOR MAKING BULBS FOR TANK VALVES.
APPLICATION FILED MAY 21, 1914.
1,167,759.
Patented Jan. 11, 1916.
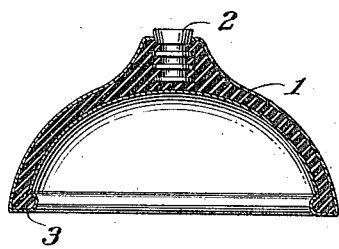
Fig. 1
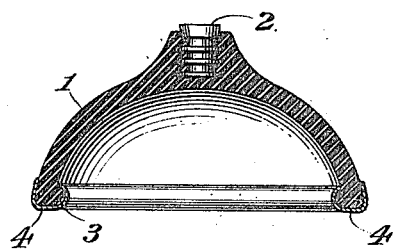
Fig. 2
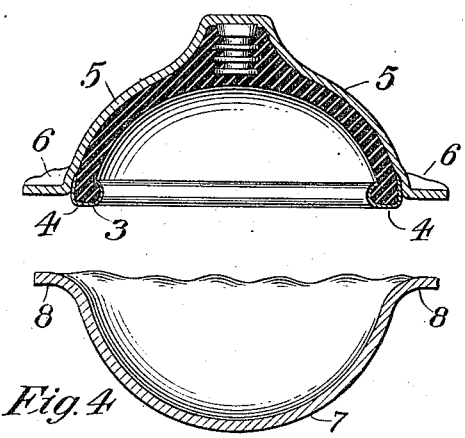
Fig. 3
Fig. 4
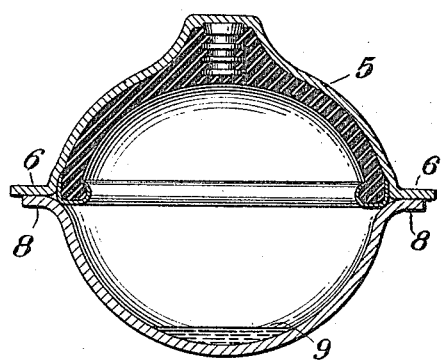
Fig. 5
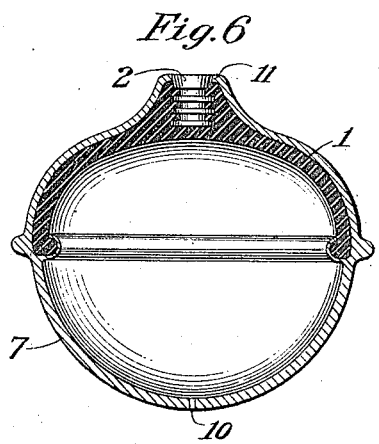
Fig. 6
Witnesses:
Edw. W. Vaill.
Veronica Braun
Inventor
Arthur T. Hopkins,
By his Attorney
Ernest Hopkinson

UNITED STATES PATENT OFFICE.

ARTHUR T. HOPKINS, OF CLEVELAND, OHIO, ASSIGNOR TO THE MECHANICAL RUBBER COMPANY, A CORPORATION OF NEW JERSEY.

PROCESS FOR MAKING BULBS FOR TANK-VALVES.

1,167,759.   Specification of Letters Patent.   Patented Jan. 11, 1916.

Original application filed April 13, 1914, Serial No. 831,608. Divided and this application filed May 21, 1914. Serial No. 839,935.

*To all whom it may concern:*

Be it known that I, ARTHUR T. HOPKINS, a citizen of the United States, residing at Cleveland, county of Cuyahoga, and State of Ohio, have invented certain new and useful Improvements in Processes for Making Bulbs for Tank-Valves, of which the following is a full, clear, and exact disclosure.

My invention relates to that class of bulbs which are adapted to close the end of the outlet pipe of a flush tank for water-closets and similar devices, which bulb is also adapted to float on the surface of the water when removed from the outlet pipe.

The object of my invention is to produce a bulb or float which is capable of being made entirely of rubber and which at the same time will be especially effective in its operation by reason of the fact that its upper hemispherical portion will be practically rigid and inflexible, while the lower hemispherical portion will be flexible and elastic and will readily conform to the valve seat in the outlet pipe.

A special object of my invention is to improve the process of manufacture of said bulbs so that the same may be made of white or light colored rubber on its exterior. It has been found in the manufacture of articles of white rubber composition when the same is vulcanized or cured to such degree as to produce considerable stiffness or rigidity, the high degree of heat required is liable to injure and stain the white rubber and therefore make its appearance objectionable. On the other hand, however, black or dark rubber composition may be cured, when it has the requisite amount of sulfur or vulcanizing substance incorporated with it, to a high degree, thereby producing the requisite stiffness without injuring its strength or appearance. With this in mind, I have devised a bulb in which the upper hemispherical portion contains a core of dark or black rubber which may be vulcanized to a greater degree than the lower hemispherical portion, while at the same time the greater vulcanization will not affect the lower portion of the bulb.

For a detailed description of one form of the bulb and the process, reference may be had to the following specification and to the accompanying drawing forming a part thereof in which—

Figures 1 to 6 inclusive are vertical sectional views of my improved bulb during different steps in the process of manufacture.

Referring to Fig. 1 of the drawing, the numeral 1 indicates a supporting member for the hemispherical upper portion of the bulb as it is first formed of dark or black rubber capable of a high degree of vulcanization so as to make the same stiff and rigid. This is preferably molded from a single homogeneous piece of raw rubber stock substantially cylindrical in form and sometimes called a "sausage." During the process of molding this portion 1 has inserted in its upper central point a thimble 2 into which the valve rod is adapted to be screwed. When this hemispherical portion 1 is molded it is then partially cured so as to give the same considerable rigidity and cause it to keep its shape, the curing being carried to such a point that the additional curing, given later on when the bulb is completely formed, will bring the total curing to the requisite point. The hemispherical supporting portion 1 which may for convenience be termed a "core," having been formed and partially vulcanized as above described, is then coated on its inner and outer surfaces with a white rubber cement which will practically give a white color to both surfaces and at the same time form an adhesive. Thereafter a narrow ribbon or strip of comparatively thin raw rubber stock is placed about the outer margin of the core 1 and the bead 3, as indicated at 4 in Fig. 2, thus forming a strong adhesive surface at the points where the two halves of the bulb are to be united. Next a sheet of raw thin white rubber stock is placed over the upper outer surface of the core 1, as indicated at 5, so that it contacts with said core down to a line adjacent its lower equatorial edge, the rubber being cut to form a narrow flap extending entirely around the core, as indicated at 6. Then a piece of raw white sheet rubber stock is pressed into the form shown at 7 in Fig. 4, having outwardly extending flanged edges or flaps 8 of substantially the same internal diameter as the flap 6. This formed lower portion 7 is then placed on the upper portion 1 and flaps 6 and 8 pressed firmly into contact so that the bulb assumes the form substantially as shown in Fig. 5. There is, however, a small quantity of water or other volatile substance introduced into the interior of the bulb before the parts are placed in contact. The flaps 6 and 8 are then trimmed off close to the outer margin of the core 1 and the whole bulb placed in the vulcanizing mold and vulcanized to the requisite degree. The heat causes the volatile substance 9 within the bulb to create an internal pressure and so expand the rubber into contact with the walls of the mold during the vulcanization or curing. The bulb is then removed from the mold and any surplus rubber buffed off, as indicated for instance at 10, so that the completed bulb assumes the form shown in Fig. 6, a small hole 10 being made at the lower end of the vertical axis of the bulb to permit the egress of the expanding fluid and the admission of air. In this completed bulb it will be observed that the same consists of a central hard core 1 in the upper portion which keeps the said portion firmly and permanently in shape, the thimble 2 being firmly embedded therein. The lower portion of the bulb consists of a very flexible and elastic wall which is firmly united to the margin of the upper portion 1, while at the same time the whole is given an attractive appearance by reason of the fact that it is completely covered with white or light colored rubber which also protects the hard rubber core from the effect of the water in which the bulb is immersed. This construction and process results in a bulb that is of much greater effectiveness than the bulbs heretofore made, has greater durability owing to the maintenance of shape and the reduced effect of the water on the rubber, and has also a more attractive appearance than the ordinary bulb made of black or dark colored rubber composition.

Having thus described this form of my invention, what I claim and desire to protect by Letters Patent is:

1. The process of making bulbs for tank valves, comprising first forming a supporting part of the upper portion thereof, applying to the part so formed by means of a suitable adhesive a covering of rubber stock, attaching to said part and said covering a hemispherical lower portion of rubber stock capable of being vulcanized, and then vulcanizing the whole.

2. The process of making bulbs for tank valves, comprising, first forming a supporting part of the upper portion thereof out of relatively hard material, applying to the inner and outer margins of the part so formed an adhesive material, covering the surfaces thereof at said margins with rubber stock capable of being vulcanized, attaching to said coverings at said margins a hemispherical portion of said rubber stock, and then vulcanizing the whole.

3. The process of making bulbs for tank valves, comprising first forming a core for the upper portion thereof out of raw rubber stock capable of being vulcanized relatively hard, partly vulcanizing the same, applying to the part so formed an adhesive material, attaching to said upper portion a hemispherical portion of sheet rubber stock capable of being vulcanized relatively soft, and then vulcanizing the whole.

4. The process of making bulbs for tank valves, comprising, first forming a core for the upper portion thereof out of raw rubber stock capable of being vulcanized relatively hard, partly vulcanizing the same, applying to the part so formed an adhesive material, covering the outer surface thereof with a sheet of rubber stock capable of being vulcanized relatively soft, attaching to said upper portion a hemispherical portion of the last named rubber stock, and then vulcanizing the whole.

5. The process of making bulbs for tank valves, comprising, first molding a core for the upper portion thereof out of raw rubber stock capable of being vulcanized relatively hard, partly vulcanizing the same, applying a strip of rubber stock to the margins thereof, attaching to said strip a hemispherical portion of raw sheet rubber stock capable of being vulcanized relatively soft, and then vulcanizing the whole.

6. The process of making bulbs for tank valves, comprising, first molding a core for the upper portion thereof out of rubber stock capable of being vulcanized relatively hard, partly vulcanizing the same, covering the same with rubber cement, applying a strip of rubber stock to the margins thereof, covering the outer surface thereof with a sheet of rubber stock capable of being vulcanized relatively soft, attaching a hemispherical portion of the last named rubber stock in sheet form to said strip and said surface covering, and then vulcanizing the whole.

7. The process of making bulbs for tank valves, comprising, first forming a core for the upper portion thereof out of rubber stock capable of being vulcanized relatively hard, partly vulcanizing the same, covering the same with rubber cement, applying a strip of rubber stock to the margins thereof, covering the outer surface thereof with a sheet of rubber stock capable of being vulcanized relatively soft and leaving an equatorial free flange, forming a hemispherical portion of rubber stock capable of being vulcanized relatively soft and having an equatorial free flange, uniting said flanges, trimming the same, and then vulcanizing the whole.

8. The process of making bulbs for tank valves, comprising, first forming a supporting part of the upper portion thereof out of relatively hard material and having an internal marginal bead, applying to the outer margin thereof and said bead an adhesive material, covering said margin and said bead with rubber stock capable of being vulcanized, attaching to said covering a hemispherical portion of the last named rubber stock, and then vulcanizing the whole.

9. The process of making bulbs for tank valves, comprising, first forming a core for the upper portion thereof out of relatively hard material, applying to the inner and outer margins thereof an adhesive material, covering the said inner and outer margins with soft rubber stock capable of being vulcanized, attaching to said sheet stock a hemispherical portion of similar stock, and then vulcanizing the whole.

10. The process of making bulbs for tank valves, comprising, first forming a supporting part of the upper portion thereof out of relatively hard material, applying to the inner and outer margins thereof an adhesive material, covering the outer surface thereof and said margins with sheet rubber stock capable of being vulcanized, attaching to said marginal coverings a hemispherical portion of similar stock, and then vulcanizing the whole.

Signed at Cleveland, county of Cuyahoga, State of Ohio, this 12th day of May, 1914.

ARTHUR T. HOPKINS.

Witnesses:
RALPH H. TYRRELL,
ELIZABETH M. CONDON.